United States Patent [19]
Meyer

[11] 3,771,895
[45] Nov. 13, 1973

[54] ADJUSTABLE CUTTING TOOL
[75] Inventor: Dieter B. Meyer, Aurora, Ill.
[73] Assignee: Skil Corporation, Chicago, Ill.
[22] Filed: Mar. 31, 1972
[21] Appl. No.: 239,891

[52] U.S. Cl. .................................. 408/174, 408/157
[51] Int. Cl. ............................................. B23b 51/08
[58] Field of Search.................... 408/196, 197, 187,
408/186, 174, 176, 157, 173

[56] References Cited
UNITED STATES PATENTS
2,803,153   8/1957   Golbeck.............................. 408/174
FOREIGN PATENTS OR APPLICATIONS
228,653   2/1925   Great Britain...................... 408/174

Primary Examiner—Andrew R. Juhasz
Assistant Examiner—Z. R. Bilinsky
Attorney—McDougall, Hersh & Scott

[57] ABSTRACT

A shank has a support disk concentrically secured thereto. The support disk includes three radially extending slots and a pair of integral ribs adjacent each slot, each pair of ribs being disposed one on each side of the associated slot in longitudinal relationship therewith. A one-piece cutting member is mounted in each slot and includes support arms in sliding engagement with the ribs. An adjustment disk is concentrically mounted on the shank for rotation relative thereto; this disk includes arcuate slots each of which receives a projection on one of the cutting members. Movement of the adjustment disk provides for the simultaneous and equal radial movement of the cutting members. Clamping means are provided for releasably holding the cutting members in their selected positions.

2 Claims, 6 Drawing Figures

PATENTED NOV 13 1973 3,771,895

3,771,895

ADJUSTABLE CUTTING TOOL

BACKGROUND OF THE INVENTION

1. Field of the Invention

The present invention relates to tools for cutting circular openings in sheet material, such as metal, wood or plastic, for example. In particular, the present invention relates to a cutting tool in the form of an attachment for a power tool, such as an electric drill, whereby circular openings of various sizes may be formed in sheet material. The cutting tool of the present invention is often referred to in the art as a "hole saw" or "dial saw."

Such a cutting tool includes a shank adapted to be engaged by the chuck of a rotary power tool, e.g., an electric drill. The shank mounts a drill bit for the purpose of starting and centering the cutting tool in the workpiece. The cutting tool includes a number of disklike members adjustably mounting three cutting blades which describe a circular path when the cutting tool is operated. These cutting blades may be adjusted radially to vary the size of the hole or opening to be formed.

2. The Prior Art

Prior art cutting tools or saws of the type under consideration may be represented by the cutting tool disclosed in Goldbeck U.S. Pat. No. 2,803,153. Such prior art devices have had limited success primarily due to the fact they have been prohibitively expensive from a manufacturing standpoint. These high manufacturing costs are due to the fact that the prior art devices include a considerable number of parts thereby resulting in rather high material costs as well as high costs of assembly.

SUMMARY AND OBJECTS OF THE INVENTION

The present invention relates to an adjustable cutting tool of the type described which is of unique construction and which is made from a very minimum of parts thereby resulting in low material costs as well as low costs in assembly during the manufacturing process.

A primary object of the present invention is the provision of an inexpensive, reliable and durable adjustable cutting tool of the type described.

Another object of the present invention is the provision of an adjustable cutting tool which is formed by a very minimum number of parts.

Still another object of the present invention is the provision of an adjustable cutting tool of the type described, wherein the support disk mounted on the shank has integrally formed guideways associated with radially extending slots, and wherein each of the cutting members is of a one-piece construction.

Another object of the present invention is the provision of an adjustable cutting tool of the type under consideration wherein the support disk and an adjustment disk constitute the sole means engaging and releasably supporting the one-piece cutting members.

These and other objects and advantages of the present invention will become apparent from the following specification disclosing a preferred embodiment shown in the accompanying drawings.

DESCRIPTION OF A PREFERRED EMBODIMENT

Figure 1:
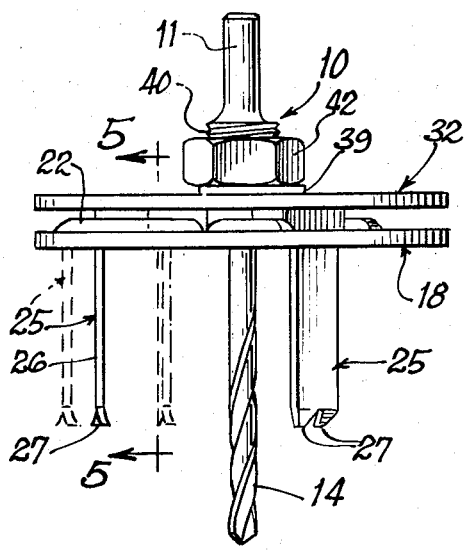
FIG. 1 is an elevational view of the adjustable cutting tool embodying the present invention.

The adjustable cutting tool of the present invention includes a shank, generally designated 10, which shank includes a cylindrical end portion 11 adapted to be received by the chuck of a suitable power tool, such as an electric drill. The other end of the shank includes a central, blind bore 12 for receiving a drill bit 14. The shank 10 includes a threaded bore 15 communicating with the bore 12, which threaded bore receives a set screw 16 for securing the drill bit 14 to the shank such that rotation of the latter imparts rotation to the former. Preferably, the drill bit 14 includes a flat portion arranged to be engaged by the set screw 16 thereby to minimize the possibility of rotation of the shank 10 relative to the drill bit 14.

A support disk, generally designated 18, includes a central aperture 19 adapting the disk for concentric mounting on the shank 10. The suppor support 18 is secured to the shank by any suitable means, e.g., welding or brazing, such that the support disk 18 will be rotated or driven by the shank 10. The support disk 18 includes a plurality, preferably three, of equally spaced, radially extending rectilinear slots 21. A pair of rectilinear ribs 22 is integrally formed on the support disk 18 adjacent each of the slots 21, as by means of a stamping operation, for example. The ribs 22 extend longitudinally of the slot 21; it is noted that each rib is spaced from the adjacent side edge of the slot 21 so as to form a shoulder surface 24. Each rib 22 and the adjoining shoulder 24 may be characterized as defining a guideway, the purpose of which will be explained hereinbelow.

The adjustable cutting tool of the present invention further includes three cutting members, each being generally designated 25. As the cutting members are of identical construction, the following description thereof will be understood to apply to each and all of these members.

Figure 2:
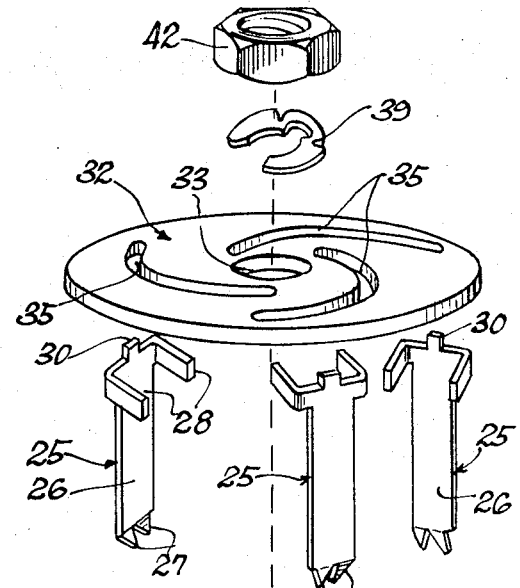
FIG. 2 is an exploded isometric view of the cutting tool.
Figure 3:
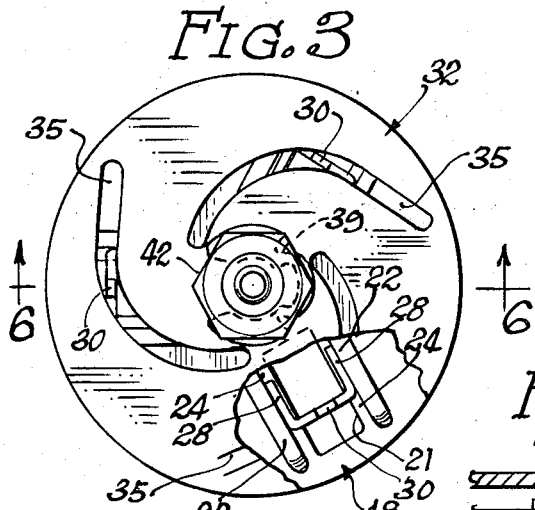
FIG. 3 is a top plan view of the cutting tool.

Referring particularly to FIG. 2, each cutting member 25 is of one-piece construction including a blade portion 26, which portion has a width slightly less than the width of the slots 21 thereby permitting such blade portion to extend through one of the slots in the support disk 18. The blade portion 26 has a distal end defined by a pair of cutting or sawing teeth 27. The other end of the cutting member 25 includes a pair of supporting arms 28 bent into parallel relationship with each other and contained in a plane which is perpendicular to the plane containing the blade portion 26. The arms 28 are dimensioned for sliding engagement with the guideways defined by each rib 22 and the adjoining shoulder surface 24 of the support disk 18. Finally, each cutting member 25 is characterized by a projection 30, the purpose of which will be explained hereinbelow.

An adjustment disk, generally designated 32, includes a central aperture 33 adapting the disk to be freely rotatably mounted on the shank 10. The adjustment disk includes three arcuate slots 35; each of the slots 35 is adapted to receive one of the projections 30 of the cutting members 25.

The shank 10 includes a reduced-in-diameter portion 37 for receiving a snap washer 39. This washer acts as a retainer to limit the amount of movement of the adjustment disk 32 axially of the shank in a direction away from the support disk 18. The shank 10 includes a threaded portion 40 for threading engagement with a clamping nut 42.

The adjustable cutting tool of the present invention may be assembled as follows: First, the drill bit 14 is secured to the shank 10 followed by securing of the support disk 18 to the shank. Next, each of the cutting members 25 is mounted by passing the blade portion 26 through one of the slots 21 and allowing the support arms 28 to come into engagement with the guideways defined by the ribs 22 and adjoining shoulders 24. The adjustment disk 32 is then mounted in place with the projection 30 on each cutting member 25 being received in one of the arcuate slots 35. Next, the washer 39 is snapped into place. This washer will prevent the adjustment disk 32 from being separated from the support disk 18 to an extent that would permit the supporting arms 28 to become disengaged or separated from the guideways. Finally, the nut 42 is threaded into place thereby completing assembly of the adjustable cutting tool.

Figure 4:
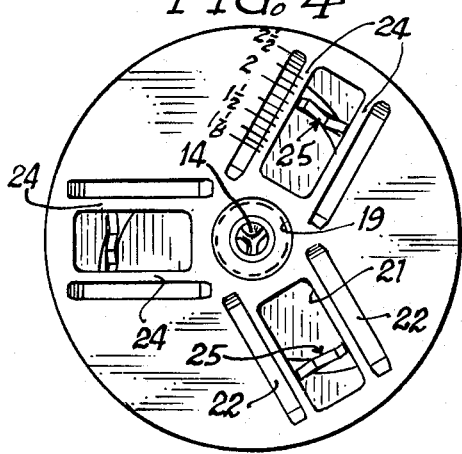
FIG. 4 is a bottom plan view of the cutting tool.
Figure 5:
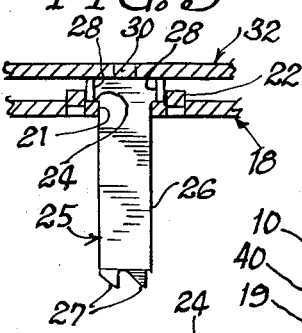
FIG. 5 is a section taken along the line 5—5 of FIG. 1.
Figure 6:
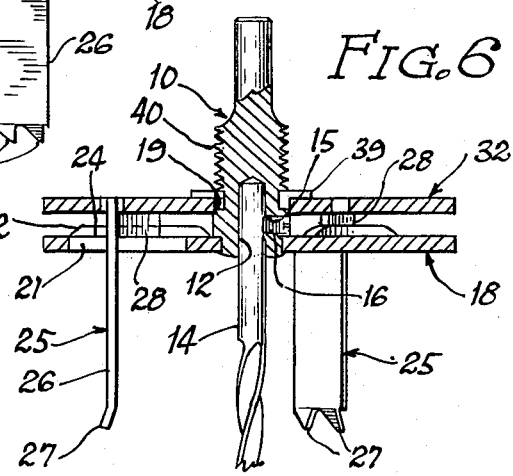
FIG. 6 is a section taken along the line 6—6 of FIG. 3.

In use, the clamping nut 42 is loosened to permit easy movement of the adjustment disk 32 relative to the support disk 18. It is apparent that such relative rotation of the adjustment disk 32 will cause the simultaneous and equal radial movement of the cutting members 25 to adjust or position the latter for cutting or sawing the desired size of hole or opening. Preferably, the bottom face of the support disk 18 has indicia thereon, as illustrated in FIG. 4, to provide an easy means to adjust the cutting members for the particular size of hole or opening required. After the cutting members 25 have been so adjusted, the clamping nut 42 is tightened thereby urging the adjustment disk 32 toward the support disk 18 for clamping or squeezing the support arms 28 on each cutting member 25.

It will be seen that the present invention provides an adjustable cutting tool or saw of simple and inexpensive construction. These desirable results are achieved in particular by making the support disk 18, as well as each of the cutting members 25, of one-piece construction. The adjustable cutting tool of the present invention is constituted by a very minimum of parts thereby reducing material costs as well as the costs of assembly.

I claim:

1. A tool for cutting a circular opening in a workpiece comprising:
   a. a shank adapted to be engaged by rotary power means;
   b. a support disk concentrically secured to said shank for being driven thereby, said support disk having a plurality of radially extending rectilinear slots therein, said support disk also having rectilinear guideways integrally formed on one face thereof adjacent said slots, respectively, in longitudinal relationship therewith;
   c. a plurality of one-piece cutting members equal in number to the number of said slots, each cutting member having a blade portion extending through one of said slots and projecting from the face of said support disk opposite said one face thereof, which blade portion has a cutting edge defining its distal end, each cutting member having at least one arm bent from said blade portion and contained in a plane perpendicular to the plane containing the blade portion, each of said arms being in sliding engagement with the adjacent guideway;
   d. an adjustment disk concentrically mounted on said shank for rotation relative thereto, said adjustment disk being adjacent said one face of said support disk and being arranged to engage said arms on said cutting members, said adjustment disk also including a plurality of arcuate slots equal in number to the number of cutting members, each of said cutting members having a projection received in the associated arcuate slot on said adjustment disk whereby rotation of the latter relative to the support disk causes equal and simultaneous radial movement of said cutting members; and
   e. clamping means on said shank engaged with said adjustment disk for urging the latter toward said support disk thereby releasably to hold said cutting members in any radial position as selected by rotation of said adjustment disk.

2. The tool according to claim 1 further defined by:
   a. said support disk being provided with pairs of said guideways, the number of pairs of the guideways corresponding to the number of said slots, the guideways of each pair of said guideways being disposed one on each side of the adjacent slot; and
   b. each of said cutting members having a pair of said arms bent from the blade portion thereof, the arms of each pair of said arms being in parallel relation with each other and in respective sliding engagement with the adjacent guideways.

* * * * *